(No Model.)
P. I. SCHMALTZ.
ENGINE VALVE GEAR.
No. 347,521. Patented Aug. 17, 1886.
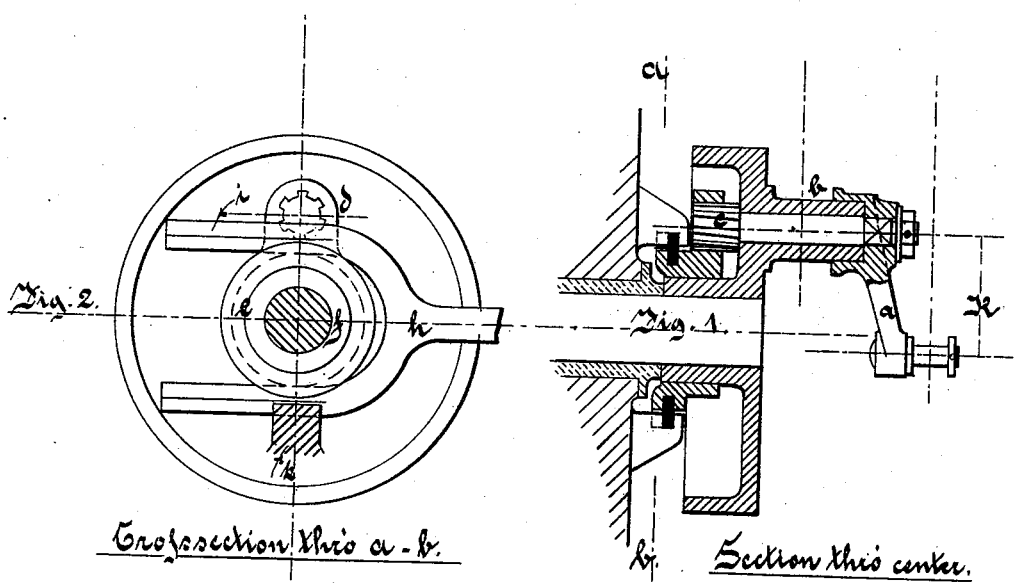
Witnesses:
Geo. C. Reid.
Jos. R. Geoghan
Inventor:
Paul I. Schmaltz

UNITED STATES PATENT OFFICE.

PAUL IMMANUEL SCHMALTZ, OF ALBANY, NEW YORK.

ENGINE VALVE-GEAR.

SPECIFICATION forming part of Letters Patent No. 347,521, dated August 17, 1886.

Application filed March 29, 1886. Serial No. 196,908. (No model.)

*To all whom it may concern:*

Be it known that I, PAUL IMMANUEL SCHMALTZ, a subject of the Emperor of Germany, residing at 98 Grand street, Albany, county of Albany, and State of New York, have invented a new and useful Engine Valve-Gear; and I do hereby declare that the following is a full, clear, and exact description of the invention, which will enable others skilled in the art to which it appertains to make and use the same.

The object of my invention is to reduce the frictional wear and resulting defects of cut-off and reversible engine valve-gears to a minimum, and to the same end to reduce the number of working parts and wearing-surfaces as found in the existing cut-off and reversing gears, thus creating a reliable valve-gear which can be operated either by hand or automatically. I attain this by making use of a counter-crank pivoted on the main crank-pin of the engine and operated by an extension of this pivot through the axis of the main crank-pin.

Figures 1 and 2 show an application of this device, and Fig. 4 a corresponding valve-diagram for either cut-off or reversing gear. Fig. 3 is an end view of a device shown in Figs. 1 and 2, showing the way I attain my object in view in every case.

The description of Figs. 1, 2, 3 is as follows: Counter-crank $a$ is pivoted on main crank-pin $b$, turned by the extension $c$ of the pivot. This extension has one or more grooves cut at an angle to the axis of said pivot to fit a corresponding nut, $d$, which, by a motion relatively parallel to the axis of the pivot, creates an impulse to the counter-crank pin to change its position. This parallel motion I attain by a sleeve, $e$, connected to said nut, which slides on a part of the crank $f$, or other part of the engine turned in line with the crank-shaft, the sleeve being provided with a ring-shaped slot, $g$, to admit of a single or forked bar, $h$. This bar $h$ has one or more inclined surfaces, $i$, attached, moving in a corresponding stationary seat, $k$. By connecting this bar with a hand-lever or governor the cut-off or the reversing valve can be operated at will.

What I claim as my invention, and desire to secure by Letters Patent, is—

1. The combination, with a variable cut-off and reversing valve gear, of a counter-crank, $a$, crank-pin $b$, and spirally-grooved extension $c$ of pivot, as shown and specified.

2. The combination, with a variable cut-off and reversing valve gear, of a counter-crank, $a$, crank-pin $b$, spirally-grooved extension $c$ of pivot, nut $d$, and sleeve $e$, with ring-shaped groove $g$.

3. The combination, with a variable cut-off and reversing valve gear, of a counter-crank, $a$, crank-pin $b$, spirally-grooved extension $c$ of pivot, nut $d$, and sleeve $e$, with ring-shaped groove $g$, single or forked bar $h$, incline $i$, and seat $k$.

PAUL IMMANUEL SCHMALTZ.

Witnesses:
 GEO. E. REID,
 JOS. R. GEOGHAN.